United States Patent
Miller et al.

(10) Patent No.: US 9,480,916 B2
(45) Date of Patent: *Nov. 1, 2016

(54) CONFLICT RESOLUTION IN ASYNCHRONOUS MULTIPLAYER GAMES

(71) Applicant: Zynga Inc., San Francisco, CA (US)

(72) Inventors: Scott G. Miller, Austin, TX (US); Nimai Malle, Austin, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,114

(22) Filed: Dec. 17, 2015

(65) Prior Publication Data

US 2016/0101357 A1    Apr. 14, 2016

Related U.S. Application Data

(63) Continuation of application No. 13/477,891, filed on May 22, 2012, now Pat. No. 9,224,259.

(60) Provisional application No. 61/530,581, filed on Sep. 2, 2011.

(51) Int. Cl.
*G07F 17/32* (2006.01)
*A63F 13/358* (2014.01)
*H04L 29/08* (2006.01)

(52) U.S. Cl.
CPC ............. *A63F 13/358* (2014.09); *G07F 17/32* (2013.01); *H04L 67/10* (2013.01)

(58) Field of Classification Search
None
See application file for complete search history.

(56) References Cited

U.S. PATENT DOCUMENTS

| 9,224,259 | B1 | 12/2015 | Miller et al. |
| 2005/0288103 | A1* | 12/2005 | Konuma ................. A63F 13/12 463/42 |
| 2012/0094751 | A1* | 4/2012 | Reynolds ................ A63F 13/12 463/29 |
| 2013/0053150 | A1* | 2/2013 | Miller ..................... A63F 13/10 463/42 |

OTHER PUBLICATIONS

"U.S. Appl. No. 13/477,891, Non Final Office Action mailed Dec. 18, 2014", 14 pgs.

(Continued)

*Primary Examiner* — Tramar Harper
(74) *Attorney, Agent, or Firm* — Schwegman Lundberg & Woessner, P.A.

(57) ABSTRACT

A method and system to host a computer-implemented multiplayer game includes functionality to identify and resolve conflicts resulting from asynchronous game play. Client system game state information that changes responsive to in-game actions performed on a client system is intermittently synchronized with authoritative game state information, during which the in-game actions may be validated. Actions that fail a prerequisite check based on the authoritative game state information are analyzed in automated fashion to determine whether they are redundant actions that fail the prerequisite check owing to their having been performed with respect to outdated client system game state information. One or more remedial actions are performed for respective redundant actions, e.g., by allowing the redundant action and modifying the game state, by restoring spent resources to affected players, or by disallowing both the redundant action and an associated preempting action.

16 Claims, 11 Drawing Sheets

(56) References Cited

OTHER PUBLICATIONS

"U.S. Appl. No. 13/477,891, Notice of Allowance mailed Aug. 25, 2015", 9 pgs.

"U.S. Appl. No. 13/477,891, Response filed Apr. 23, 2015 to Non Final Office Action mailed Dec. 18, 2014", 26 pgs.

* cited by examiner

CONFLICT RESOLUTION IN ASYNCHRONOUS MULTIPLAYER GAMES

CLAIM OF PRIORITY

This application is a continuation of U.S. patent application Ser. No. 13/477,891, filed on May 22, 2012, which claims the benefit of priority under 35 U.S.C. §119(e) to U.S. Provisional Patent Application Ser. No. 61/530,581, filed on Sep. 2, 2011, the benefit of priority of each of which is claimed hereby, and each of which is incorporated by reference herein in its entirety.

TECHNICAL FIELD

This disclosure generally relates to games and applications in general and, in particular embodiments, to computer-implemented games, such as online role-playing games (RPGs) that are playable by more than one person from more than one location.

BACKGROUND

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, neighbor, friend, and the like may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

A client-side computing device or computer system may present the online game to the user by executing coded game logic or scripts for the online game. For example, a player may visit a virtual city of the online game, and may perform an in-game action by initiating a battle between the player's player character and another character in the virtual city. To perform and animate the battle, the player's client computing device may execute game view logic (e.g., JavaScript or ActionScript) to generate a visual representation of the in-game action, while execution of the battle or in-game action by game logic on the client computing device may make changes to a game state associated with the player based on the in-game action.

Such client-side execution of in-game actions allows near real-time interaction between the player and the client computing device, promoting immersive gameplay action. When multiple players, however, perform actions with respect to a common environment, environment state information on respective client computing devices may be out of synchronization with each other or with authoritative game state information on a master database, which can occasionally result in conflicts in environment state information and/or player state information.

DESCRIPTION OF EXAMPLE EMBODIMENTS

Figure 1:
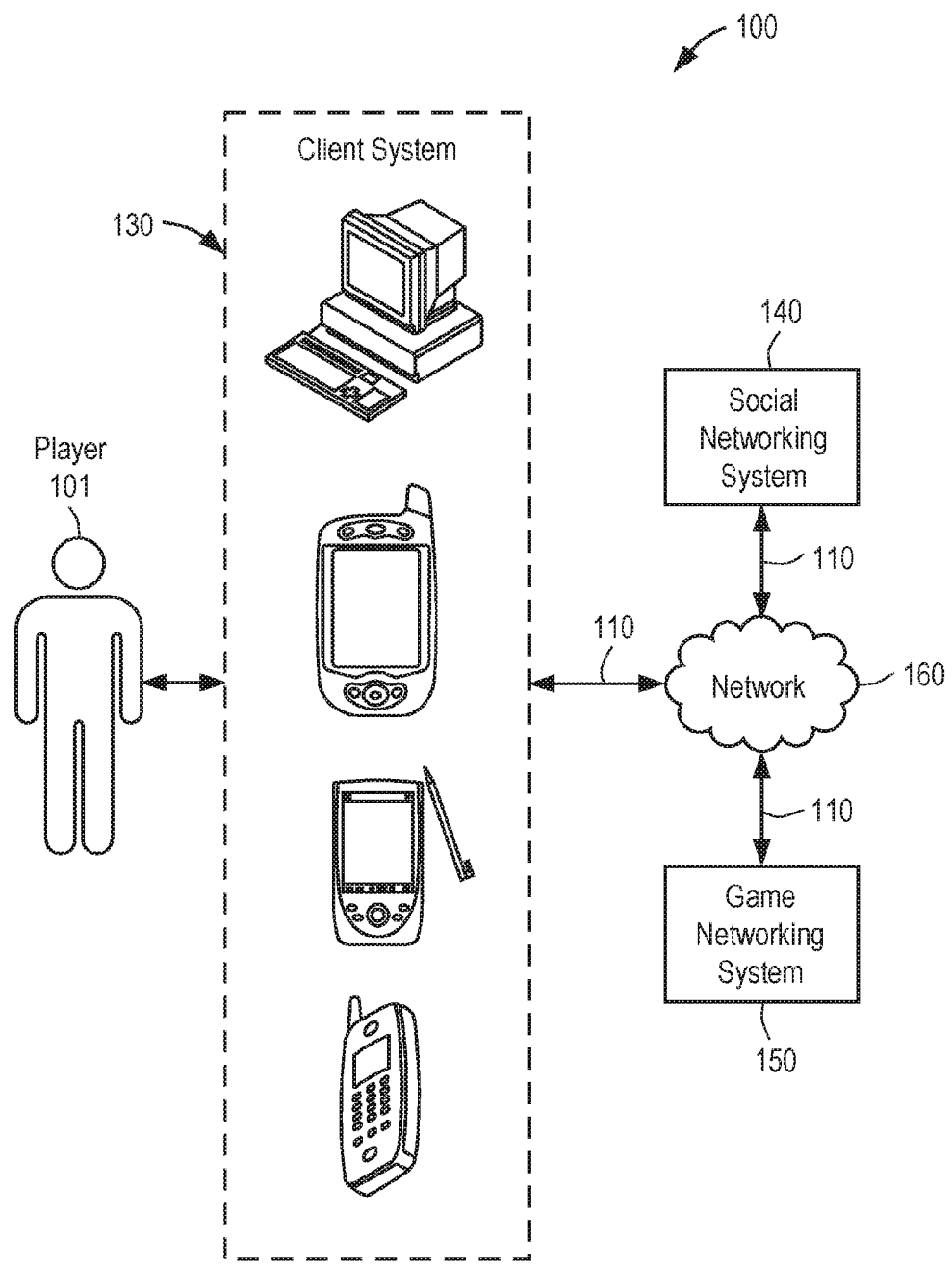
FIG. 1 illustrates an example of a system for implementing particular disclosed embodiments.

One example embodiment may provide a method and system to provide an asynchronous multiplayer game. The method and system may include functionality to resolve conflicts in asynchronous multiplayer online gameplay. The method may comprise, on a server-side validation system, validating in-game actions performed on a client system in a multi player online game, for example by executing server-side validation actions identical to the in-game actions. Validating in-game actions may include performance of at least one prerequisite check with respect to authoritative game state information, such as master game state information under control of the server-side validation system, to determine whether or not the in-game actions were permitted actions. Actions that fail the prerequisite check may be identified as potentially invalid actions, and the system may determine for respective potentially invalid actions whether the potentially invalid action is a redundant action that failed the prerequisite check owing to its having been performed with respect to outdated game state information on the client system.

In-game actions are performed on the client system with respect to client system game state information that is stored on the client system and that is periodically or intermittently synchronized with authoritative game state information under the exclusive control of the server-side validation system. Such synchronization may comprise updating the authoritative game state information with respect to actions performed on the client system since the last synchronization, and incorporating game state changes resulting from the client system in-game actions if those in-game actions are validated. The client system game state information is at the same time updated to include game state changes resulting from in-game actions that were performed by other players on other client systems and that was synchronized with and validated by the server-side validation system since the last synchronization between the client system game state information and the authoritative game state information.

Situations may thus occur where the player, on the client system, performs an in-game action which is valid based on the client system game state information, but which is invalid when based on the authoritative game state information at the next synchronization. Such an action is referred to herein as a redundant action, while the client system game state information with respect to which a redundant action is originally performed is occasionally referred to as outdated game state information. A particular action by another player that causes a change in the authoritative game state information, thereby resulting in redundancy of the redundant action, is referred to herein as a preempting action. For example, if a second player upgrades an in-game object, e.g. a virtual building, but upgrading of the object is not reflected in the client system game state information of a first player when the first player also upgrades the same object, then the upgrading action performed by the second player is a preempting action with respect to the redundant upgrading action performed by the second player.

Example embodiments disclosed herein provide a system and method to resolve such conflicts arising from asynchronous multiplayer gameplay. Responsive to identifying a potentially invalid action, it is determined whether or not the invalid action is a redundant action. If a redundant action is identified, a remedial action may be executed to resolve differences between the client system game state information and the authoritative game state information that result from the redundant action. Performance of the remedial action may be conditional upon a positive determination by the system that the potentially invalid action is a redundant action. Remedial actions may include, for example, restoring resources spent on the redundant action by way of a reverse synchronization message, allowing the redundant action if predefined criteria are satisfied, and reversing both the redundant action and a preempting action performed by a second player.

In some embodiments, server-side coded validation logic to perform the validation actions may be identical to client-side coded game logic by which the in-game actions were executed. In other embodiments, server-side validation may be performed in a manner different from that by which validation is performed by client-side game logic.

An example game environment for implementing the above-described method and system is described below, whereafter the example embodiment is described in greater detail, in the context of the example game environment.

Example Game Environment

FIG. 1 illustrates an example of a system for implementing various disclosed embodiments. In particular embodiments, system 100 comprises player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 140 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking system 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections I/O include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections I/O need not necessarily be the same throughout system 100. One or more first connections I/O may differ in one or more respects from one or more second connections 110. Although FIG. 1 illustrates particular connections I/O between player 101, social networking system 140, game networking system 150, client system 130, and network 160, this disclosure contemplates any suitable connections between player 101, social networking system 140, game networking system 150, client system 130, and network 160. As an example and not by way of limitation, in particular embodiments, client system 130 may have a direct connection to social networking system 140 or game networking system 150, bypassing network 160.

Game Networking Systems

In an online computer game, a game engine manages the game state of the game and effects changes to the game state based on in-game actions performed by a player (e.g., player 101 of FIG. 1). A game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs) and in-game objects. The game engine also manages game state, including player character state for currently active (online) and inactive (offline) players.

Figure 2:
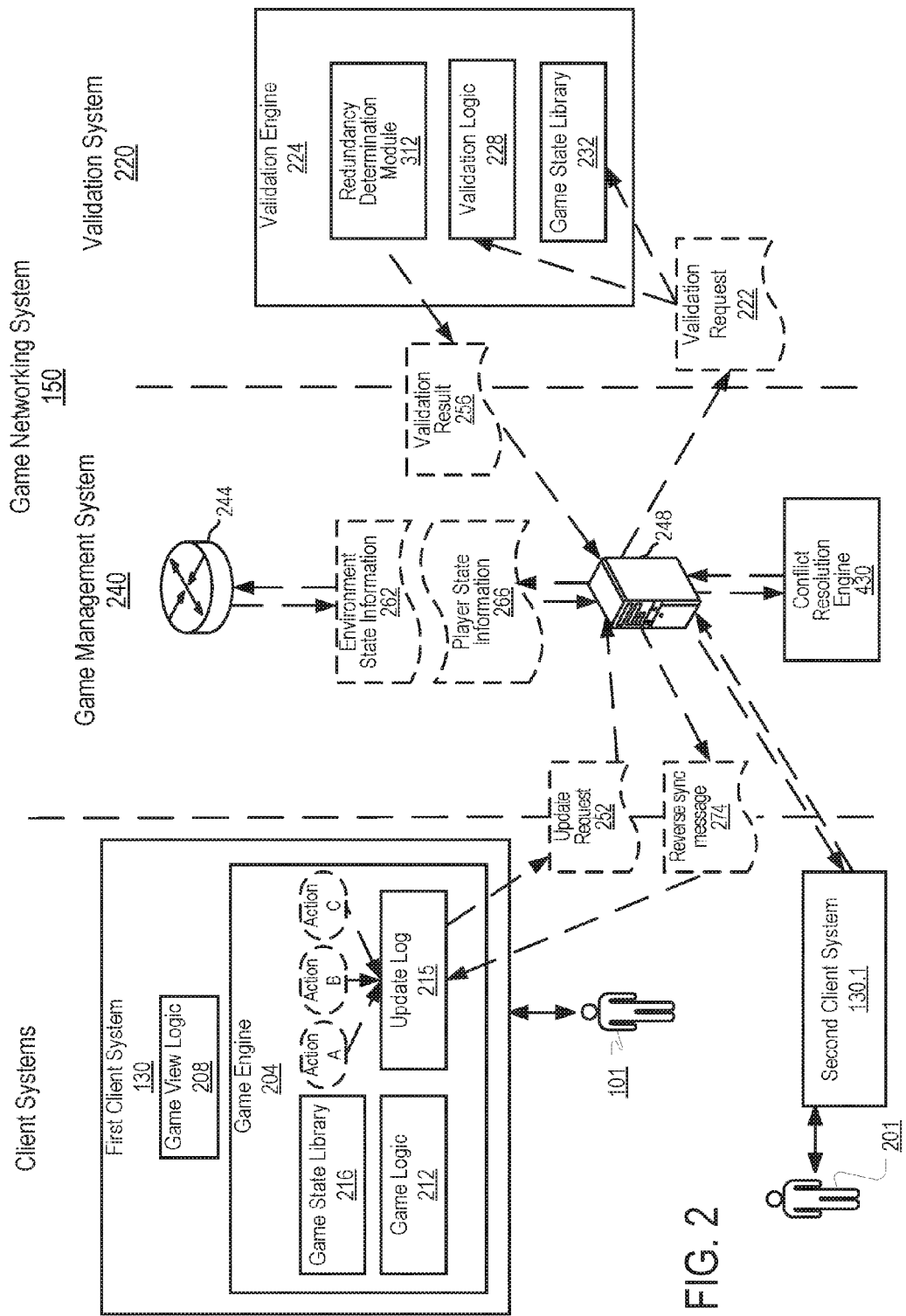
FIG. 2 illustrates a more detailed view of an example system for implementing an example embodiment.

In the example environment illustrated in FIGS. 1 and 2, an online game can be administered by game networking system 150, while a game engine 204 may be hosted on the client device or client system 130. The game networking system 150 can be accessed by the client system 130 using any suitable connection. A player may have a game account on game networking system 150, wherein the game account can contain a variety of information associated with the player e.g., the player's personal information, financial information, purchase history, player character state, game state). In some embodiments, a player may play multiple games administered by game networking system 150, which may maintain a single game account for the player with respect to all the games, or multiple individual game accounts for each game with respect to the player. In some embodiments, game networking system 150 can assign a unique identifier to each player 101 of an online game administered by game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In embodiments in which the game engine 204 is provided by the client system 130, player 101 may access the game and control the game's progress via client system 130 (e.g., by inputting commands to the game at the client device). Client system 130 may display the game interface by use of game view logic 208 (FIG. 2), receive inputs from player 101, and may perform in-game actions or events responsive to the user inputs by means of game logic 212, forming part of the game engine 204. The game logic 212 may effect changes to game state information associated with the player 101 caused by the in-game actions performed responsive to user input. The client system 130 may also maintain a game state library 216 that stores game state information indicative of the game state associated with the player 101. Game state information may, for example, include player state information and world state information or environment state information. This disclosure discusses potentially invalid actions resulting from out-of-sync game state information, and is thus applicable to any multiplayer game in which respective devices store player-specific game state information that are synchronized from time to time with authoritative game state information (such as master game state information), regardless of the particular architecture for implementing such a multiplayer game.

The client system 130 may be in continuous communication with the game networking system 150 or may intermittently transfer to the game networking system 150 update information with respect to in-game actions executed by the game engine 204. Client system 130 can thus, for example, download client components of an online game, which are executed locally, while a remote game server, such as game networking system 150, provides backend support for the client components and may be responsible for maintaining the application data of the game, updating and/or synchronizing the game state based on the game logic 212, and each input from the player 101, and transmitting instructions to client system 130. Execution of the game engine 204 on the client system 130 enables off-line and/or asynchronous gameplay by a user via the client system 130.

Game Play

In particular embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in a online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In particular embodiments, player 101 can perform an in-game action on an in-game object or with respect to another player character. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In particular embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player can access a new area of the game).

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or nonexclusive (i.e., accessible by any player). The features relating to resolution of game state conflicts as described herein may in many embodiments be with respect to nonexclusive game instances, where multiple players may perform actions with respect to commonly accessible in-game objects, characters and/or environments. In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as "guest players." In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In particular embodiments, the set of in-game actions available to a specific player may be different in a game instance that is associated with that player e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Example System

FIG. 2 illustrates an example embodiment of a game networking system 150 for implementing particular disclosed embodiments. The game networking system 150 includes a validation system 220 to validate in-game actions performed in an online game. In the example embodiment of FIG. 2, the validation system 220 is to validate in-game actions in a multiplayer online game, typically a massively multiplayer online game, but in other embodiments, the methodologies and systems described herein can be employed to validate in-game actions in a single player online game, for example where client system game state information may become outdated due to in-game actions by an administrator or NPCs. It will be appreciated that the game networking system 150 typically serves multiple client systems 130 that are associated with respective players 101. For ease of description, only two client systems and associated players are schematically shown in FIG. 2, namely a first player 101 that plays the game on a first client system 130, and a second player 201 that plays the game on a similar or analogous second client system 130.1.

Figure 3A:
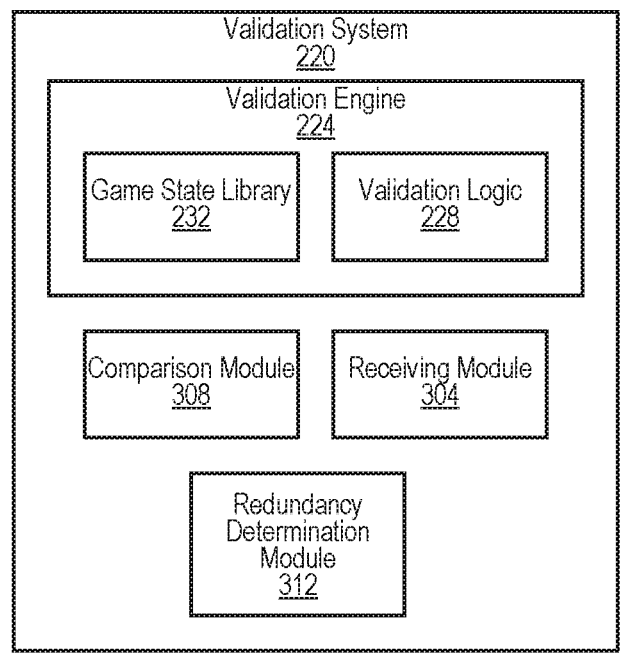
FIGS. 3A and 3B illustrate an example validation system and game management system for implementing particular disclosed embodiments.

FIG. 3A illustrates an example validation system 220 forming part of the game networking system 150 of FIG. 2. The validation system 220 may comprise a number of hardware-implemented modules provided by one or more processors. The validation system 220 may include a receiving module 304 to receive a validation request 222 (see FIG. 2) that includes: one or more action identifiers to indicate corresponding in-game actions executed on the client system 130; and provisional game state information with respect to the game state of the player 101 and execution of the one or more in-game actions indicated by the validation request 222. In some embodiments, the validation request 222 may include player inputs received at the client system 130 to cause execution of the relevant in-game actions.

The validation system 220 may further include a validation engine 224 that comprises coded validation logic 228 to execute validation actions identical to the in-game actions identified in the validation request 222. The validation logic 228 may be identical to the game logic 212 forming part of the game engine 204. As used herein, the term "identical" with respect to coded logic means not only that identical operations are automatically performed responsive to identical inputs, but also means that the code of the respective coded logic is in the same format and/or computer programming language and may thus be used interchangeably. In an example embodiment, the game logic 212, and the validation logic 228 may be identical sequences of ActionScript code. In some instances, the validation engine 224 may be identical to the game engine 204, while, in other example embodiments, the validation engine 224 and the game engine 204 may be different, but may have identical game logic 212 and validation logic. In other embodiments, server-side validation of client-side in-game actions may be performed by validation logic that is not identical to client-side game logic.

The validation engine 224 may further include a game state library 232 to temporarily hold game state information with respect to the player 101. The validation logic 228 and the game state library 232 may be configured to cooperate, so that the validation logic 228 executes validation actions based at least in part on game state information stored in the game state library 232, and updates or changes the game state information in the game state library 232 based on the validation actions.

A comparison module 308 (FIG. 3A) may further form part of the validation system 220 to compare results of execution of the validation actions (e.g., verification game state information resulting from execution of the validation actions by the validation logic 228) to the provisional game state information included in the validation request 222. The comparison module 308 may be configured to validate the relevant in-game actions by determining that the provisional game state information is identical to the verification game state information, e.g., that performance of the validation actions by the validation engine 224 has the same effect on the immediately prior game state information as execution of the corresponding in-game actions by the game engine 204.

The validation system 220 may also include a redundancy determination module 312 that is configured to determine whether or not a potentially invalid action is a redundant action. For example, the validation logic 228 may perform prerequisite checks to determine whether or not a particular in-game action was valid based on the authoritative game state information at the time. Failure of such prerequisite checks may be due to player malfeasance, or it may be due to redundancy of the client system game state information with respect to which the action was performed. The redundancy determination module 312 may automatically parse relevant game state information and/or synchronization history to determine whether or not failure of a particular prerequisite check is as a result of game state information redundancy. Although the redundancy determination module 312 is, in this example, shown to form part of the validation system 220, the redundancy determination module 312 may, in other embodiments, form part of a game management system, such as the game management system 240 described below with reference to FIGS. 2 and 4.

Referring to FIG. 2, the game networking system 150 may further comprise a game management system 240 comprising a game state database 244 in which validated game states for a plurality of players may be persisted or stored. The game management system 240 further comprises a synchronization management device or synchronization manager 248 to receive update requests 252 from client systems 130, to generate and send validation request 222 to the validation system 220, to receive a validation result 256 from the validation system 220, and to persist validated game state information in the game state database 244. In the example embodiment shown in FIG. 2, the synchronization manager 248 is a Web server. In other embodiments, the functionalities of the game management system 240 and the validation system 220 may be provided by a single game management system located at a particular site, so that action validation, game state synchronization, and conflict resolution are performed by a single game management system. An example of such a system is later described herein with reference to FIG. 4.

Figure 3B:
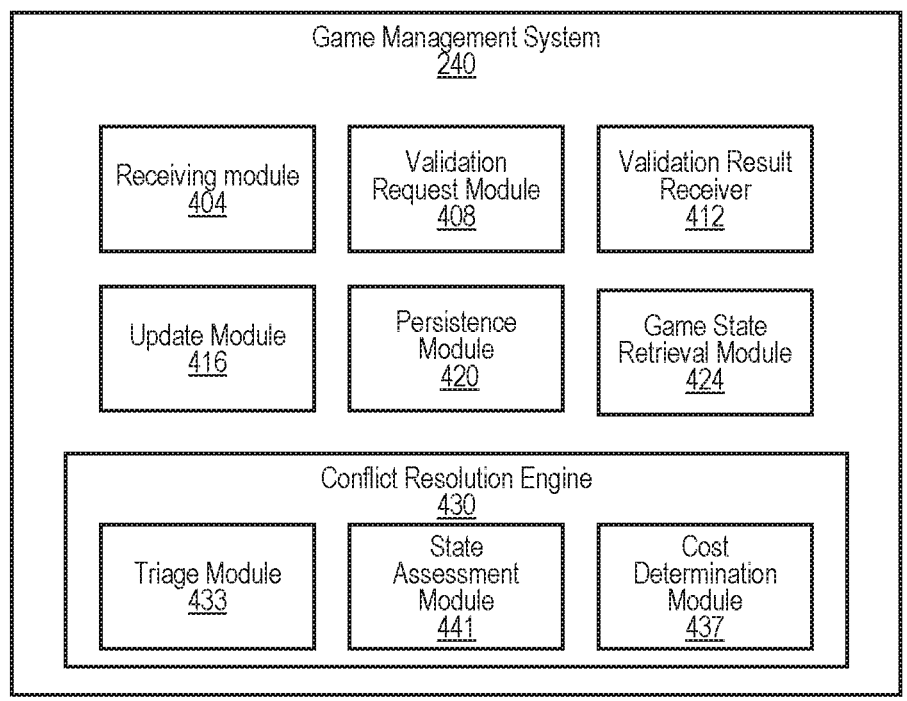

FIG. 3B illustrates a number of components of an exemplary game management system 240, in this example embodiment being provided by the Web server providing the synchronization manager 248. The game management system 240 includes a receiving module 404 to receive an update request 252 (see FIG. 2) that includes action identifiers indicating a number of in-game actions executed on the game engine 204 of the client system 130, and further includes provisional game state information resulting from performance of the relevant in-game actions. In some embodiments, the provisional game state information may include the client system game state information with respect to which the in-game actions were performed. In this embodiment, however, the game management system 240 may include a game state retrieval module 424 to retrieve prior game state information that indicates previously validated authoritative game state information immediately before execution of the relevant in-game actions indicated in the update request 252. The game management system 240 may further include a validation request module 408 to generate and transmit a validation request 222 in response to reception of the update request 252. The game management system 240 further includes a validation result receiver 412 to receive a validation result 256 (FIG. 2) that indicates whether or not in-game actions included in the validation request 222 have been validated. An update module 416 may further be provided to generate validated game state information based at least in part on the provisional game state information included in the update request 252, and based at least in part on the validation result 256, and a persistence module 420 may be provided to process the updated game state information and to persist the updated game state information to the game state database 244. The updated and validated game state information forms the authoritative game state information under the control of the game management system 240, with respect to which future in-game actions are to be validated.

The game management system 240 may also provide a conflict resolution engine 430 to resolve redundant actions and/or game state conflicts that may stem from redundant actions performed with respect to outdated or out-of-sync game state information on the client system 130. Operation of the conflict resolution engine 430 is described at greater length below with reference to FIG. 6B and FIG. 7.

The conflict resolution engine 430 may, for example, include a triage module 433 that comprises conflict resolution logic to automatically decide one or more remedial actions with respect to the game state conflict. Such remedial actions may include, for example, validating one or both of the redundant action and its associated preempting action, invalidating one or both of the redundant action and its associated preempting action, and/or ameliorating detrimental or undesired in-game effects stemming from the redundancy (e.g., by restoring spent resources associated with an invalidated redundant action and/or an invalidated preempting action), by state changes to in-game objects involved in the conflicting actions, and/or by the adjustment of in-game score or experience levels).

The conflict resolution engine 430 may accordingly include a cost determination module 437 to automatically determine costs of the relevant actions, e.g. by assessing the value of in-game resources spent in performing the actions. The conflict resolution engine 430 may further include a state assessment module 441 to determine and/or assess possible game state conflicts (including, e.g., player state conflict and world state conflicts) that may result from one or more permutations of validating or invalidating the conflicting actions.

Although the conflict resolution engine 430 is shown, that in this example embodiment, to form part of the game management system 240, the conflict resolution engine 430 may, in other embodiments, be provided as part of the validation system 220.

Figure 4:
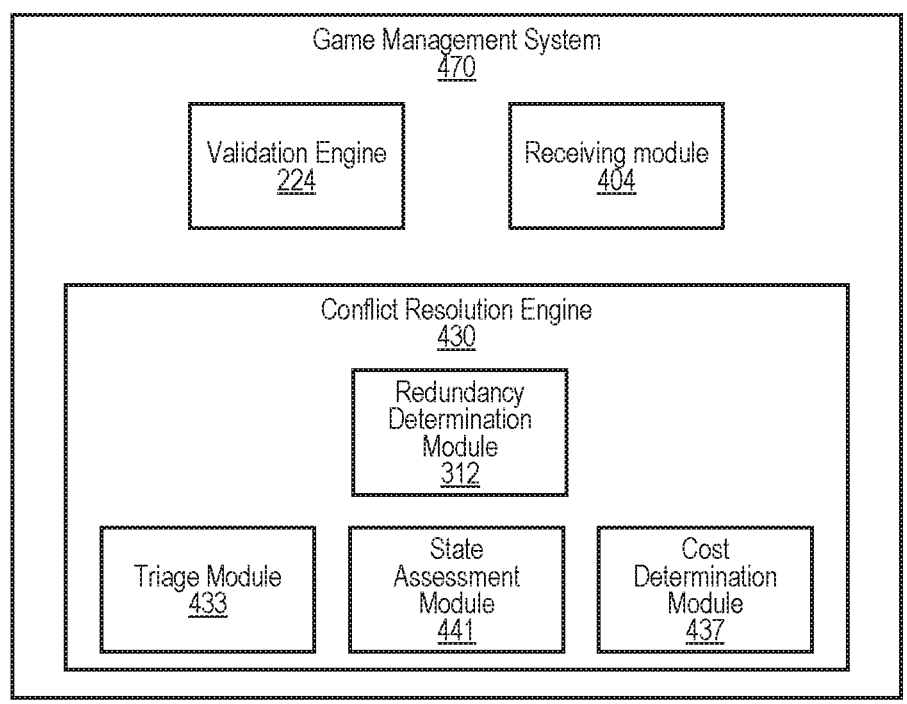
FIG. 4 illustrates an example game management system for implementing particular disclosed embodiments.

FIG. 4 shows an example embodiment of a game management system 470 in which the conflict resolution engine 430 includes a redundancy determination module 312 such as that described with reference to FIG. 3A. The game management system 470 therefore operates without generating a validation request that is sent to a validation system, instead of performing validation, redundancy determination, and conflict resolution on-board. The game management system 470 may further include a validation engine 224 and a receiving module 404.

Functionality of the validation system 220, the game management system 240 and their respective components, in accordance with an example embodiment, are further described below with respect to example methods.

Example Methods

Figure 5A:
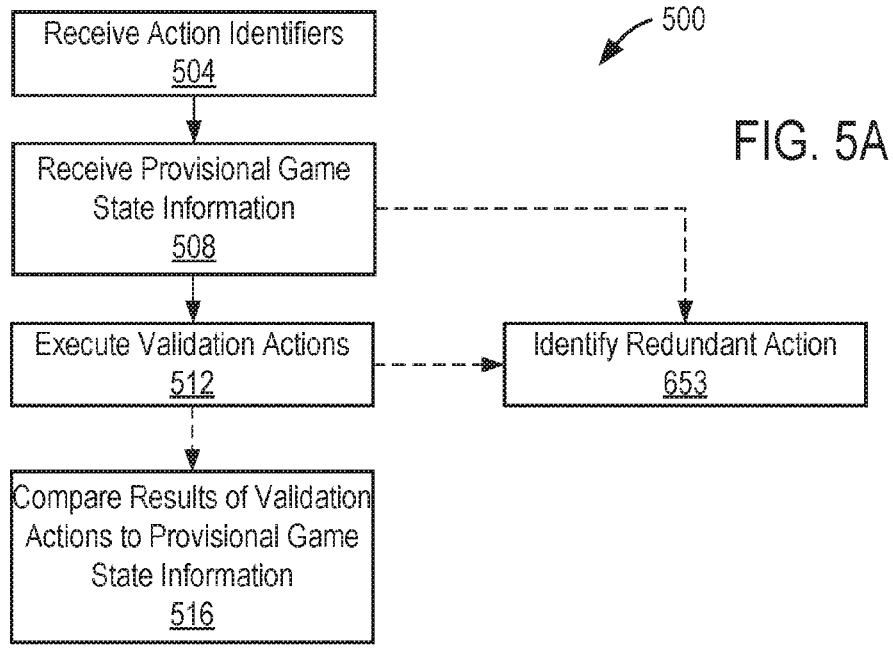
FIGS. 5A, 5B and 5C illustrate high-level views of respective methods of implementing exemplary embodiments.

FIG. 5A shows a flowchart 500 of a high-level view of an example method, performed by a validation system such as validation system 220 (FIG. 2), validate in-game actions performed in a multiplayer online game. The method of flowchart 500 comprises receiving from the game management system 240 action identifiers, at operation 504, and provisional game state information, at operation 508. The action identifiers and provisional game state information may be included in a validation request 222 that may be a serialized communication, for example being in XML, format. The action identifiers may be with respect to a plurality of in-game actions performed by the game logic 212, the provisional game state information being with respect to changes to the game state associated with the player 101 caused by execution of the in-game actions. The validation engine 224 may thereafter execute validation actions, at operation 512, by use of the validation logic 228.

Before or during execution of the validation actions, one or more of the actions may be identified as a redundant action, at 653.

Results of execution of the validation actions, e.g., in the form of verification game state information generated by the validation engine 224, are compared, at operation 516, to the provisional game state information included in the validation request 222, to validate the in-game actions indicated by the validation request 222. If the provisional game state information with respect to a particular in-game action is identical to verification game state information for a corresponding validation action, then the particular in-game actions may be validated.

Figure 5B:
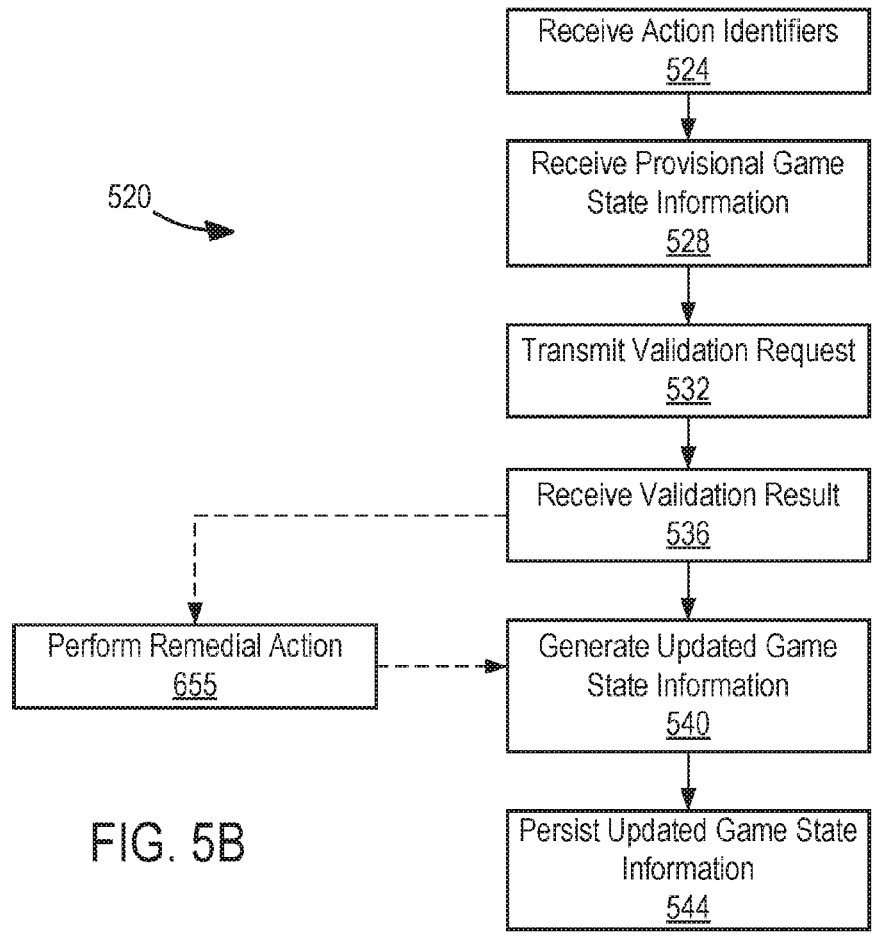

FIG. 5B shows a flowchart 520 of a high-level view of an example method, performed by a game management system such as game management system 240 (FIG. 2), to validate in-game actions performed in a multiplayer online game. The method of flowchart 520 comprises receiving from the client system 130 a plurality of action identifiers, at operation 524, and provisional game state information, at operation 528. The action identifiers and provisional game state information may be included in an update request 252 (FIG. 2) that may be a serialized message, in the present example embodiment being in XML format. A validation request 222 may thereafter be transmitted, at operation 532, to the validation system 220, to validate the in-game actions indicated by the action identifiers in the update request 252 by executing validation actions identical to the in-game actions by the validation logic 228 that may be identical to the game logic 212 of the game engine 204, on which the in-game actions were initially executed. Note that, in other embodiments, validation of the in-game actions may be performed differently.

The game management system 240 may subsequently receive a validation result 256 (FIG. 2) from the validation system 220, at operation 536, indicating that one or more of the in-game actions have been validated, or indicating that one or more redundant actions have been identified. If any of the actions were identified as being a redundant action, remedial action may be performed, at 655.

The game management system 240 may thereafter generate updated game state information, at operation 540, based on the validation result 256 and based upon prior game state information that indicates previously validated game state information immediately before execution of the relevant in-game actions. The updated game state information is then persisted, at operation 544. Note that the result of the method is to synchronize game state information between the client system 130 and the game management system 240/470. Therefore, synchronization is complete when, after operation 544, the game state information in the client system game state library 216 is identical to the game state information on the game state database 244.

Figure 5C:
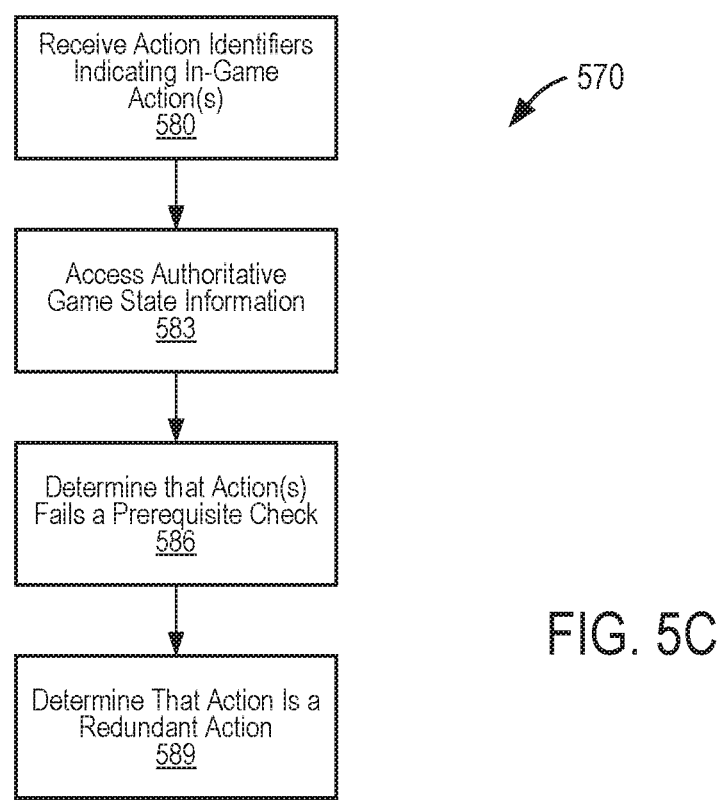

FIG. 5C is a further example embodiment of a method that may be performed by example systems described herein, for example being performed by the game management system 470 of FIG. 4, although the method 570 may also be performed by respective components of the validation system 220 and game management system 240 of FIG. 3A. The method 570 may comprise receiving, at 580, one or more action identifiers that indicate corresponding in-game actions executed on a client system. Authoritative game state information may be accessed, at 583, the authoritative game state information indicating a validated game state prior to execution of the respective actions. It may thereafter automatically be determined whether or not the respective actions that fail the prerequisite, e.g., by determining whether or not the respective actions should have been allowed based on the respective validated game states. If it is determined, at 586, that a particular action fails a prerequisite check, it is determined, at 589, whether the particular action is a redundant action. Determination of the redundancy of the particular action may be by determining that the particular action was erroneously permitted by the client system owing to its having been performed on the client system with respect to outdated client system game state information.

Figure 6A:
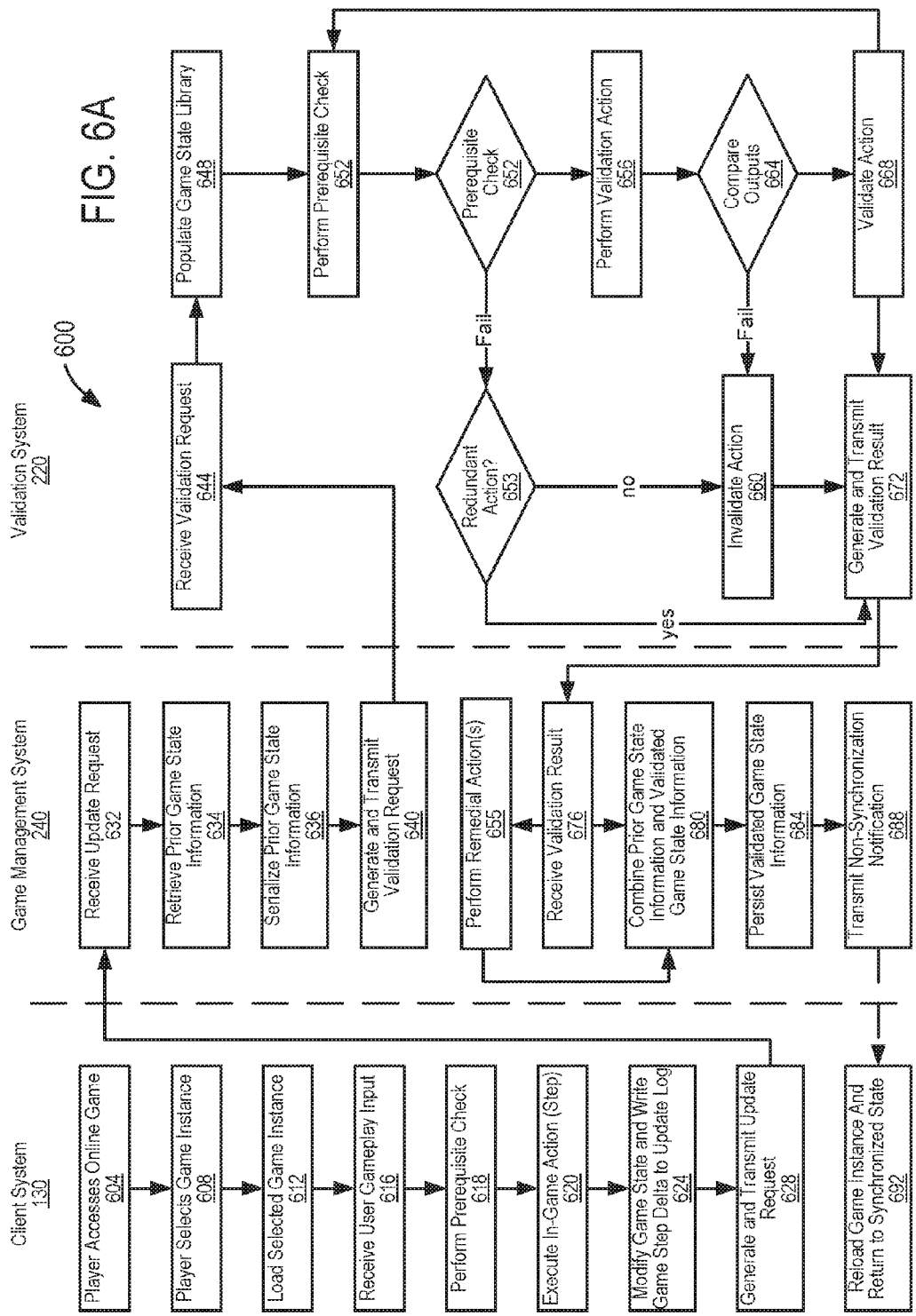
FIGS. 6A and 6B illustrate flowcharts for example methods of implementing particular disclosed embodiments.

FIG. 6 shows a more detailed flowchart 600 of a method to validate in-game actions in a multiplayer online game, and to synchronize game state information in the multiplayer online game. The method of flowchart 600 may be implemented in one embodiment by example system 100 of FIG. 1, with some of the operations being performed by example game management system 240 or example validation system 220 described with reference to FIGS. 3 and 4 above, in the game environment described with reference to FIGS. 1 and 2 above. The flowchart of FIG. 6 is illustrated as being divided into so-called swim lanes, to indicate which of the operations are performed by the client system 130, the game management system 240, or the validation system 220, respectively.

At operation 604, the player 101 may access the multiplayer online game on the client system 130. Although not illustrated in the flowchart 600 of FIG. 6, the client system 130 may access a webpage hosted by social networking system 140 on the game networking system 150, whereafter the first player's social networking information may be accessed. In particular embodiments, social networking information on the social networking system 140, the game networking system 150, or both may be accessed. At operation 608, the player 101 may select a game instance to access. In particular embodiments, game instances can be selected from a set of game instances associated with the first player's friends in the relevant social network. Here, the player 101 selects the game instance uniquely associated with him/her. At operation 612, the game engine 204 may then load the game instance associated with the player 101. Loading of the game instance, at operation 612, may include retrieving a last synchronized or validated game state or game state information from the game management system 240, and loading of the game state information into the game state library 216 of the game engine 204 provided by the client system 130. In the present example embodiment, the game state library 216 is a PHP Hypertext Preprocessor (PHP) library. Loading of the game instance may further include generating, by use of the game view logic 208 (FIG. 2), a user interface including a game display that includes a visual representation of a virtual in-game environment of the game instance.

The player 101 may provide gameplay input, at operation 616, to the client system 130, the input, for example, being encountered by the game view logic 208. Upon receipt of input to perform an action that may affect game state, one or more assumption checks or prerequisite checks may be performed, at operation 618, to check whether or not predefined prerequisites or assumptions are satisfied in order to perform the relevant actions. Such prerequisite checks may include, for example, checking whether or not the player character has a required minimum in-game experience level, whether an in-game object on which the action is to be performed has a predefined status to permit performance of the action, and so forth. If the predefined prerequisite check(s) for a particular in-game action is satisfied, the action is executed, at operation 620.

In-game actions that may affect game state information of the player 101 may be executed, at operation 620, by the game logic 212 of the game engine 204, the game logic 212 in this instance being ActionScript code. The game logic 212 may be configured such that in-game actions that affect game state are modified into atomic logic elements that are referred to herein, inter alia, as "steps." In FIG. 2, an exemplary sequence of in-game actions or steps are illustrated as Actions A-C. In some embodiments, logic common to the game engine 204 and the validation engine 224 (e.g., game logic 212, and identical validation logic 228 in the example embodiment of FIG. 2) may be limited to game logic that affects game state, while other game logic (e.g., game logic that does not affect game state information) may be located on the client system 130 only.

Upon execution of each in-game action or step, at operation 620, the game engine 204 may modify the game state information in the game state library 216, and may additionally record the step or action and its resulting game state delta or game state change(s), at operation 624, in an update log 215 (FIG. 2) forming part of the client system 130. In the present example embodiment, the game state deltas or game state changes recorded in the update log 215 may be game step deltas respectively indicating changes to the game state information caused by performance of a corresponding one of the in-game actions or steps.

In the present example embodiment, game state information in the game state library 216 may be maintained in a property tree or graph with respect to the player 101. Such a property tree may be maintained, for example by the game management system 240, with respect to each of the multiplicity of players of the multiplayer online game, and may be loaded into the game state library 216 upon loading of an associated game instance by the game engine 204. The property tree may contain nested sets of property values that are organized locally. Each property of the property tree is defined by a respective key, which may be a dot-separated list of tree nodes and a final leaf name. Both nodes and names are strings consisting of lowercase letters, numbers, dashes or underscores. An example property tree for a simple slot machine game may look as follows:

player.name:string
player.high_score:int
player.high_score.date:date
inventory.coins:int
achievements.match_three.state:int
achievements.match_two.state:int Game state information in the exemplary form of a property tree as described above may facilitate translation to XML format, so that transmissions of game state information between the game management system 240 and the client system 130 may be serialized, for example being XML communications. An XML version of the above exemplified property tree, may read as follows:

```
<properties>
    <player>
        <name type="string">
            John Doe
        </name>
        <high_score type="int">
            3500
            <date type="string">
                2009.11.25 5:32:09
            </date>
        </high_score>
    </player>
    <inventory>
        <coins type="int">
            274
        </coins>
    </inventory>
    <achievements>
        <match-two>
            <state type="int">1</state>
        </match_two>
        <match_three>
            <state type="int">0</state>
        </match_three>
    </achievement>
</properties>
```

Game step information written to the update log 215 may include inputs received for the respective actions or steps, and game step deltas in the form of property changes to the property tree or game state information resulting from execution of the associated action or step. The client system 130 may intermittently or periodically generate checkpoints or update requests 252, at operation 628, with respect to in-game actions or steps which have not yet been validated and/or which have not been included in a previous update request 252, and may transmit the update request 252 to the game management system 240.

The game client system 130 may produce a serialized update request 252, for example in XML format. Each update request 252 may include action identifiers for the associated in-game actions, as well as provisional game state information in the form of game step deltas resulting from the respective actions. The action identifiers may comprise an action type or step type identifier, as well as identification of user input that prompted performance of the action. Provisional game state information may be provided for each action included in the update request. Such action of a specific game state information may comprise an absolute value for a particular property after completion of the action, or it may comprise a change or delta to a particular property resulting from performance of the action. The provisional game state information may comprise only those properties of the player character that have been affected by performance of the respective action. An example serialized update request 252 may read as follows:

```
<checkpoint>
    <properties user_id="1:12345">
        ... strata state
    </properties>
    <sync>
        <property>
            <name>sound</name>
```

-continued

```
            <type>boolean</type>
            <value>false</value>
        </property>
    </sync>
    <step type="com.zynga.kingdoms.steps.Movement">
        <input><to>5</to></input>
        <output>
            <property>
                <name>location</name>
                <type>int</type>
                <value>5</value>
            </property>
            <property>
                <name>energy</name>
                <type>int</type>
                <delta>-1</delta>
            </property>
        </output>
    </step>
    <step type="com.zynga.kingdoms.steps.Movement">
        <input><to>6</to></input>
        <output>
            <property>
                <name>location</name>
                <type>int</type>
                <value>6</value>
            </property>
            <property>
                <name>energy</name>
                <type>int</type>
                <delta>-1</delta>
            </property>
        </output>
    </step>
</checkpoint>
```

It will be noted that the above example XML checkpoint or update request 252 includes a synchronization that blindly sets the player state to advance non-validated player state between steps. The example update request 252 above identifies two in-game actions. The first action is identified by an action type identifier as being a movement action. The action identifiers further include an input having a value of 5. Provisional game state information in the form of game state information for the first action comprises location and energy level outputs resulting from performance of the first action. Thus, the player character's location has a value of 5 after performance of the first movement action, while the energy level of the player character is decremented by a single unit due to the action. The second action indicated by action identifiers in the above example XML update request 252 comprises a number movement action having an input value of 6 and an output value of 6, while the performance of the second movement action also results in decrementing of the energy level by a further unit.

Update requests 252 such as that exemplified above may be generated and transmitted at regular intervals (for example at intervals of 30 seconds to two minutes), or may be generated and transmitted intermittently. In instances of off-line play input, information, output information, and game step deltas may be stored in the update log 215 until the game client system 130 is reconnected to the game management system 240, at which time the relevant information with respect to all in-game actions which have not yet been included in a transmitted update request 252 may be included in a single update request 252. At the completion of the updating process described with reference to FIG. 6A, and in some cases the performance of remedial actions as described below with reference to FIG. 6B, the game state library 216 of the client system 130 is synchronized with the game state database 244 of the game management system 240.

In some instances, some of the in-game actions indicated in the update request 252 may comprise actions or events having an element of randomness. For example when a player character engages in an in-game battle with a non-player character, the game engine 204 may generate a random seed as an input before execution of the battle. The update request 252 may in such instances include the randomly generated input, or random seed, related to the in-game action or event.

Upon receipt of the update request 252 by the receiving module 404 (FIG. 3B) of the game management system 240, at operation 632, the game state retrieval module 424 (FIG. 3B) accesses a persistence subsystem in the form of the game state database 244, and retrieves prior game state information, at operation 634, with respect to the player 101 and the particular game instance indicated by the update request 252. The prior game state information indicates previously validated game state information immediately before execution of the one or more in-game actions indicated in the update request 252. In the present example, the prior game state information includes player state information 266 (FIG. 2), and environment state information 262 in the example form of world state information. The environment state information 262 may indicate the last validated state of the in-game environment or virtual world, for example indicating the location, type, and states of virtual objects in the in-game environment. The player state information 266 may, for example, be a last validated property tree, such as that described above with respect to the claim client system 130, for the relevant player character. Both of the environment state information 262 and player state information 266 may be in a format that is serializable.

The method of flowchart 600 may include serializing the prior game state information, at operation 636, and may thereafter include generating and transmitting a validation request 222, at operation 640, by means of the validation request module 408 (FIG. 3B). The validation request 222 includes the action identifiers and provisional game state information received in the update request 252 (e.g., action type identifiers, input information, and output information), together with serialized environment state information 262 and player state information 266. The validation request 222 is transmitted, at operation 640, to the validation system 220.

Upon receipt of the validation request 222, at operation 644, by the receiving module 304 (FIG. 3A) of the validation system 220, game state library 232 of the validation engine 224 is populated, at operation 648, with the prior game state information included in the validation request 222 (e.g., the environment state information 262 and the player state information 266).

Thereafter, validation actions corresponding to the in-game actions indicated in the validation request 222 may be performed by the validation logic 228 of the validation engine 224. As mentioned before, the validation logic 228 may comprise ActionScript code identical to that of the game logic 212 forming part of the game engine 204 of the game client system 130, as shown in FIG. 2. Such performance of the validation actions may comprise, with respect to each action, performing a prerequisite check, at operation 652, and, if the prerequisite check is successful, performing the relevant validation action, at operation 656. It will be appreciated that the prerequisite checks may be performed with respect to the prior game state information in the game state library 232. The prerequisite checks may, in particular, be performed based on respective validated game states (as indicated by the authoritative game state information) for each action. One or more prerequisite check may thus be performed for each action, to verify that predefined game state information criteria (e.g., environment state information criteria and/or player state information criteria) are satisfied by the validated game state. Thus, for example, certain actions with respect to certain in-game objects may only be available when the objects are in a predefined state, while the player character is in a predefined state, and so forth.

If the prerequisite check fails, the redundancy determination module 312 determines, at operation 653, whether or not the relevant action is a redundant action, that is, an action for which the prerequisite check failed owing to outdated or out-of-sync client system game state information. The method for determining whether or not a particular action is a redundant action is described further below with reference to FIG. 7. If the action under consideration is not a redundant action, then the action may be an illegal action, possibly owing to attempted hacking or player malfeasance, or the action may fail the prerequisite check owing to a system bug or programming error. In such cases, the action is invalidated, at operation 660. If, however, it is determined, at operation 653, that the action under consideration is a redundant action, the relevant action may be indicated as a redundant action in a validation result 256, resulting in performance of remedial action(s), at operation 655. In this example, the remedial action(s) is performed by the triage module 433. Example remedial actions, as well as conflict resolution logic for determining which remedial action to take are later described with reference to FIG. 7.

Returning now to FIG. 6A, performance of the validation action, at operation 656, may include generation of verification game state information, in this example being validation output resulting from performance of the validation action. Because the validation logic 228 is identical to the game logic 212, execution of identical actions based on identical game state information should result in identical outputs. Game state changes, deltas, or outputs resulting from performance of each validation action may thus be compared, at operation 664, with the corresponding output of the associated in-game action indicated in the validation request 222. If the validation output (also referred to as the results of execution of the relevant validation action) is identical to the corresponding in-game output (also referred to as the provisional game state information), then the in-game action is validated, at operation 668. If, however, there is a discrepancy between the validation output and the corresponding in-game output, then the relevant action is invalidated, at operation 660.

When a particular action is validated, at operation 668, the sequence of operations to validate an action, at operations 652 to 668, is performed for the next in-game action indicated in the validation request 222. The plurality of in-game actions indicated in the validation request 222 are thus validated stepwise, in sequence, until all of the actions have been validated, or until a first invalid action or redundant action is identified, either by failure of a prerequisite check, at operation 652, or by identification of a discrepancy between the validation output and the in-game output, at operation 664.

When validation of the sequence of in-game actions of the validation request 222 is completed (or when one of the in-game actions are invalidated or identified as being redundant), the validation result 256 is generated and transmitted, at operation 672, to the game management system 240. Generation of the validation result 256 may comprise assembling or collating a resultant or cumulative game state delta resulting from all of the validated actions or steps. Property values in the validation result 256 may thus indicate a final output (e.g., for a property such as location) or a cumulative delta (e.g., for property such as player character energy or experience) at the last validated action. The validation result 256 may again be serialized, in the example embodiment being an XML document. An extract of an example validation result 256, following validation of all of the actions indicated in the exemplary validation request 222 provided above, may look as follows:

```
<checkpoint success="true">
    <sync>
        <property>
            <name>sound</name>
            <type>boolean</type>
            <value>false</value>
        </property>
        <property>
            <name>location</name>
            <type>int</type>
            <value>6</value>
        </property>
        <property>
            <name>energy</name>
            <type>int</type>
            <delta>-2</delta>
        </property>
        <property>
            <name>rng_seed</name>
            <type>int</type>
            <value>1807257224</value>
        </property>
    </sync>
</checkpoint>
```

After receiving the validation result 256 at operation 676, the game management system 240 may perform remedial action(s), at 655, if required, and combines the game state deltas for validated game state information indicated in the validation result 256 with the prior game state information, at operation 680, to produce updated game state information that is whole, consistent, new game state information, in the present example embodiment comprising validated environment state information 262 and validated player state information 266. The validated game state information may be stored by being persisted to the game state database 244, at operation 684, thus forming updated authoritative game state information.

In the event of invalidation of any in-game action by the validation system 220 at operation 660 (and/or if the remedial action(s) includes invalidation of any action), the game management system 240 may communicate a non-synchronization notification to the client system 130, at operation 688, to notify the client system 130 that the game state information of the client system 130 is out of synchronization with the game management system 240, e.g., that the provisional game state information included in the update request 252 could not be completely validated. The non-synchronization notification may identify the last or furthest validated action and/or may indicate furthest validated for validated game state information. In response to receiving the non-synchronization notification, the client system 130 may cause operation of the game engine 204 to stop gameplay, forcing the player to reload the game instance, and returning to a furthest consistent or synchronized state, at operation 692, as indicated in the non-synchronization notification.

The conflict resolution engine 430 may serve to resolve conflicts stemming from concurrent actions (e.g., including identified redundant actions) performed by different players owing to the game state information on one of their client systems 130 conflicting, with the authoritative game state information in the game state database 244 when the associated update request 252 is sent. Such conflict resolution may include performance of the remedial action(s), at 655. As used herein, the term "game state information" may in some embodiments encompass both environment state information and player state information. The architecture and validation method described with reference to FIG. 2 permits asynchronous play, in that a player's client system 130 is not in direct and continual communication with the game management system 240, but instead only intermittently communicates update requests 252 to validate in-game actions and to synchronize game state information on the player's game engine 204 and on the central game state database 244. Two or more players may thus play the game asynchronously, potentially giving rise to game state conflicts.

For example, when two or more players perform actions with respect to a common in-game object, situations can occur where one player performs an in-game action that is permitted on the associated client system 130 based on client system game state information (e.g., the game state information stored in the game state library 216 when the relevant action is performed) that is out-of-sync with master game state information (also referred to herein as authoritative game state information) in the master game state database 244 at synchronization time, while the action would not have been permitted if the client system game state information was synchronized with the authoritative game state information when the action was performed. As described previously, when an update request 252 with respect to such a conflicting in-game action is received, a prerequisite check operation (e.g. at 652 in FIG. 6A) by the validation system 220 is performed based on authoritative game state information provided by the master game state database 244 that may be different from the game state information on the player's game engine 204 when the action was performed, and may thus indicate that certain actions are redundant, even though such actions were validly performed by the game engine 204, but based on outdated game state information. The conflict resolution system, comprising the conflict resolution engine 430, is configured to address such conflicts, and, in certain instances, to allow redundant actions. For ease of description, two conflicting actions (e.g. two actions that are performed with respect to a common in-game object or environment and that may caused a conflict as described above) are referred to as a preempting action and a redundant action. The preempting action may be the one of the relevant two actions which is first communicated to the game management system 240 in a synchronization or update request 252. The later synchronized of the two actions may in such case be referred to as the redundant action. Of course, there may in some instances be more than one preempting actions, and more than one redundant actions.

Figure 7:
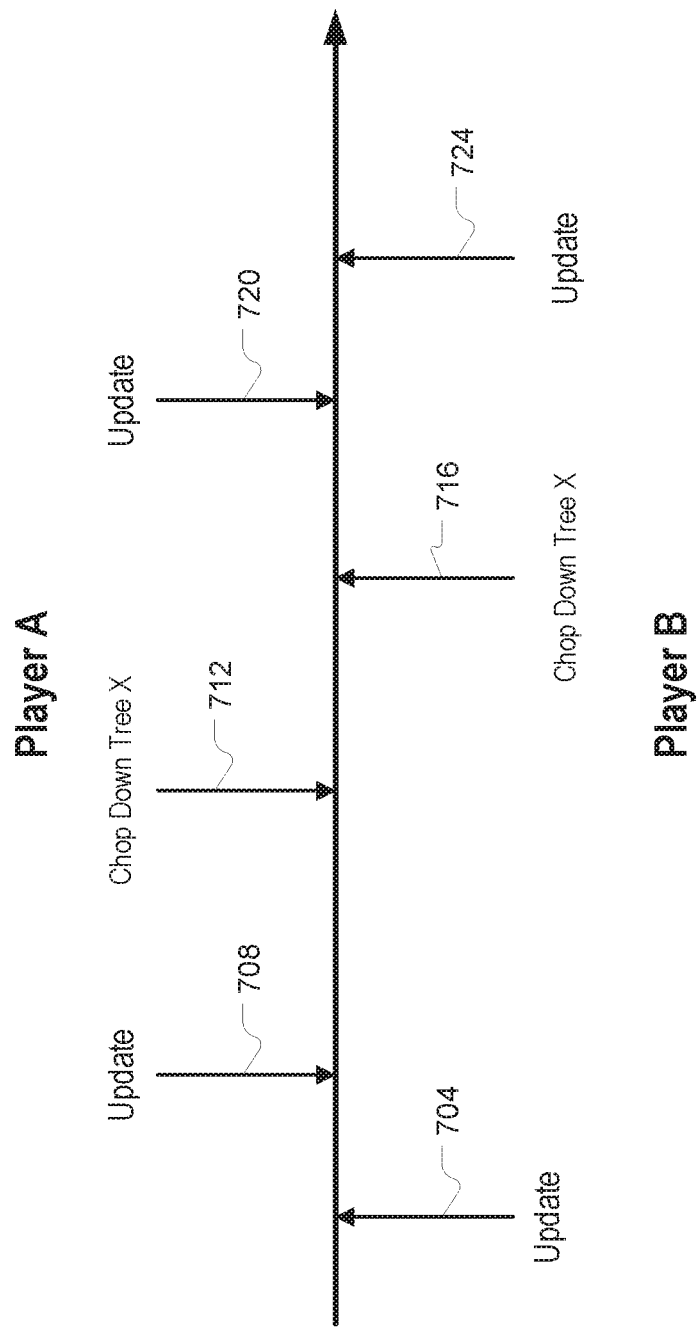
FIG. 7 illustrates a timeline showing a series of actions by two players with respect to a common environment in a multiplayer online game, resulting in a game state conflict.

FIG. 7 shows a timeline of an example situation in which a game state conflict and a resulting redundant action may arise. The timeline of FIG. 7 is with respect to actions performed using two respective client systems (indicated as first client system 130 and second client system 130.1 in FIG. 2) by two players 101, 201, in a shared virtual environment to which both players have access and in which the players have overlapping rights. For ease and clarity of description, player 101 (playing the game on the first client system 130) is further referred to as player A, and player 201 (playing the game on the second client system 130.1) is further referred to as player B. The actions of player A are indicated above the timeline of FIG. 7, while the actions of player B are indicated below the timeline.

Player B may send an update request 252 at time 704, synchronizing the game state information in the game state library 216 of player B with the game state database 244 at time 704. Player A may thereafter likewise update a series of in-game actions at time 708.

Player A may thereafter perform an in-game action with respect to an in-game object by, for example, chopping down a virtual tree, at time 712. This action causes changes to client system game state information in the game state library 216 of player A, for example recording a change in client system environment state information reflecting that the relevant tree is chopped down, and reflecting depletion of resources in player A's client system player state information. When the first client system 130 of player A next sends an update request 252, at time 720, the game state changes resulting from chopping down a tree may be validated by the validation engine 224 and may be recorded in the game state database 244 of the game management system 240.

Between successive synchronizations or update requests 252 by the second client system 130.1 of player B (for example between the updates or checkpoints at times 704 and 724 of FIG. 7 respectively), the game engine 204 of the second client system 130.1 is unaware of any in-game actions performed by player A. Client system game state information on the game engine 204 of player B may therefore be out of sync with the game state database 244. For example, if player B wishes to chop down, at time 716, the same tree that was chopped down by player A (at time 712), the game engine 204 of player B will not be aware that the tree in question has already been chopped down by player A. Because validation checks for chopping down the tree based on the client system game state information on the second client system 130.1 will be passed, the game engine 204 of player B will allow player B to chop down the relevant tree, and will animate and display the action to player B. It will be appreciated that the above situation would apply even if the chopping down of the tree by player B were to occur (in real-time) after the update by player A (at time 720), because the second client system 130.1 of player B only receives information indicative of prior chopping down of the tree upon its first update (at time 724) following the update by player A (at time 720). In this example, chopping down of the tree by player A at 712 is a preempting action with respect to the redundant action of chopping down the tree by player B at 716.

The validation engine 224 thereafter performs validation of the in-game actions performed by player B and identified in the update request 252 sent at time 724. Such validation is performed with reference to authoritative game state information, e.g., environment state information 262 and player state information 266 retrieved from the game state database 244. The authoritative game state information reflects the previously validated chopping down of the relevant tree by player A. When the validation engine 224 performs a prerequisite check for chopping down the tree by player B, the prerequisite check fails, because the tree that was chopped down by player B had already been chopped down according to the authoritative environment state information 262. The game networking system 150 (or, in the example embodiment of FIG. 4, the game management system 470) may include a redundancy determination module 312 to determine whether or not the invalidated action is a redundant action, and a conflict resolution engine 430 to process the conflict and to resolve the conflict in a least invasive or detrimental manner.

The redundancy determination module 312 may be configured to determine whether a conflicting action is a redundant action, and the conflict resolution engine 430 may perform remedial action(s), which may include allowing (and therefore validating) the redundant action. A redundant action is thus a conflicting action that was performed inadvertently owing to out-of-sync game state information. If, however, the redundancy determination module 312 determines that the conflicting action is not a redundant action, e.g., not being inadvertent, it may determine that the conflicting action is due to malicious activity by player B (e.g. attempted hacking), or is due to a system error (e.g., a programming bug).

Figure 6B:
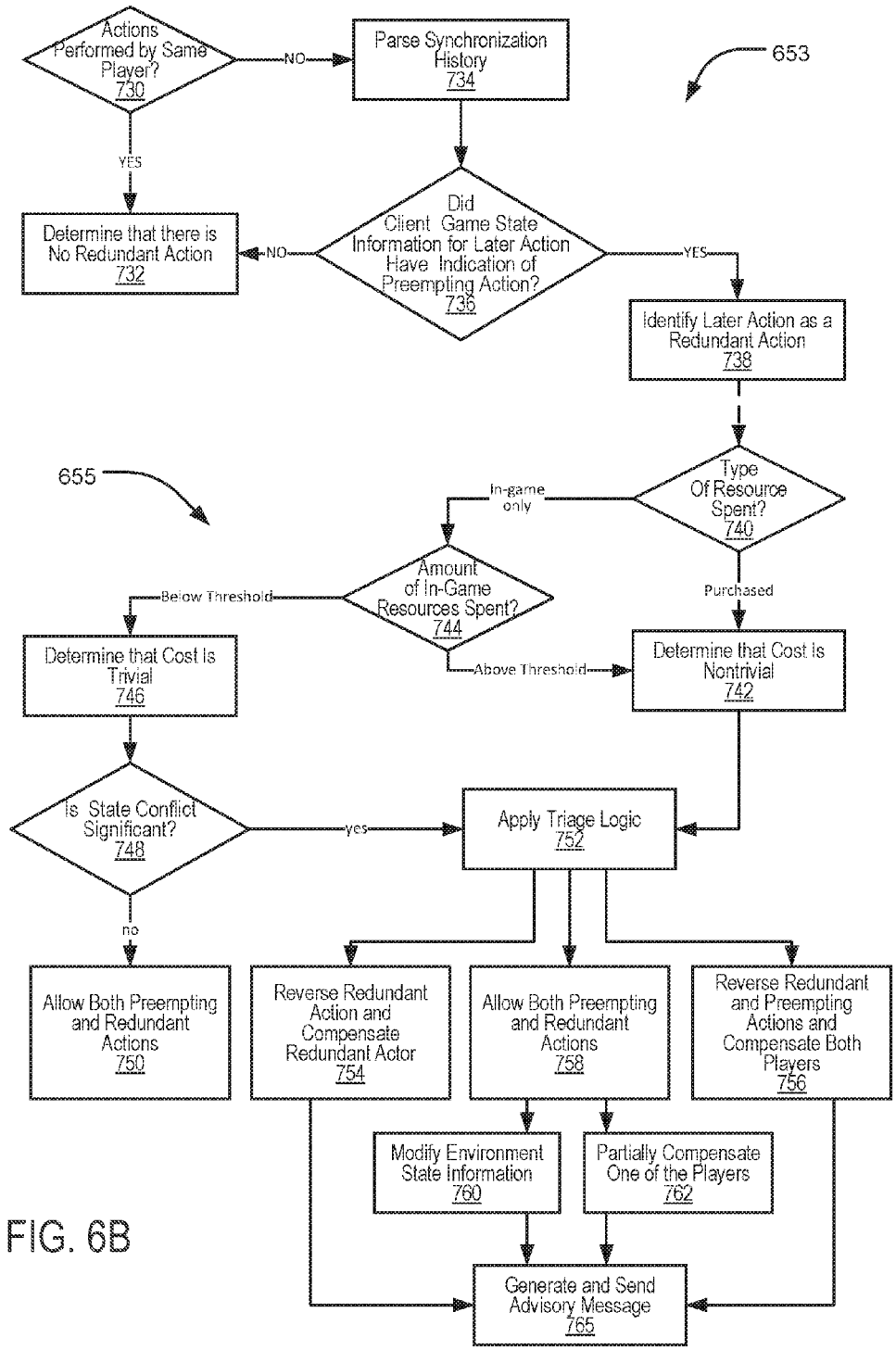

FIG. 6B shows a flowchart of example methods of determining whether one of the conflicting actions is a redundant action (generally indicated by reference numeral 653), and of performing remedial action(s) (generally indicated by reference numeral 655.

A first step in determining whether or not a conflicting action is a redundant action is to determine, at 730, whether or not the two conflicting actions were performed by the same player. If the conflicting actions were indeed performed by the same player, it is determined, at 732, that there is no redundant action, and the conflicting action will thus be disallowed or invalidated by the validation system 220. Thus, for example, if player A chopped down the same tree again after time 712 (FIG. 7), then it may be assumed that the second instance of chopping down a tree was due to a system bug or to illegal activity by player A.

If, however, the conflicting actions were performed by separate players, synchronization history information for the relevant client systems (e.g. first client system 130 and second client system 130.1) may be parsed, at 734, to consider the time sequence of performance of the potentially redundant action relative to updates or synchronizations between the game management system 240 and the respective client systems of player A and player B, thereby to distinguish between redundant actions and illegal/malicious actions or bugs. In this example embodiment, the redundancy determination module 312 is configured to determine, at 736, whether or not client system game state information on the second client system 130.1 of player B would have included an indication of the preempting action (in this example of chopping down of the tree at time 712 by player A) at the time when player B executed the potentially redundant action (e.g. chopping down the tree at time 716).

For example, the conflicting action may be considered a redundant action only if a synchronization or update by the later synchronizing player (player B) that immediately precedes the potentially redundant action (e.g. the update at time 704, that precedes the action at time 716) precedes the synchronization or update by the earlier synchronizing player (player A) in which the preempting action is communicated to the game management system 240 (e.g. the update at 720, that communicates the action at 712). In some instances, the redundant action may thus, in real-time, be performed before the preempting action, but will be considered a redundant action if its associated update or synchronization occurs after the update or synchronization for the preempting action. In other examples, the redundant action may be performed after the update associated with the preempting action, but will still be considered a redundant action because the client system game state information of player B not be apprised of the preempting action until the first update by player B following the update by player A for the preempting action.

To facilitate and enable discrimination by the validation engine 224 between redundant actions and illegal actions or bugs, synchronization history information that is indicative of the time of respective in-game actions and updates, as well as the identity of persons performing the actions and identities, may be recorded and may be communicated to the validation system 220 and the game management system 240, e.g. by way of the update request 252 and/or the validation request 222.

Once it is determined, at 738, that a conflicting action is indeed a redundant action (e.g., that it is an inadvertent conflicting action owing to out-of-sync game state information) remedial action may be taken, at 655 by the validation system 220 and/or the game management system 240. The particular remedial action to be taken may be action specific, and/or may be determined by the conflict resolution logic or triage logic provided by the triage module 473 based on the nature of the action, its effect on the in-game environment, and/or the nature and amount of resources spent on performing the redundant action.

For example, a redundant action with a trivial cost and a limited environmental effect may be allowed, at 750, so that resources spent by the later acting player (e.g. player B in the example of FIG. 7) remains spent, and the environment or object with respect to which the redundant action was performed remains in its state at the end of performance of the redundant action. In the example of FIG. 7, e.g., chopping down a tree may expend a relatively small amount of player B's in-game energy level, so that redundant chopping down of the tree by player B may be considered to have a trivial cost to player B. In such an instance, player B will not be aware of the redundancy of his action with respect to chopping down of the tree, so that the conflict is effectively resolved in a least invasive manner.

Whether a cost for a particular action is trivial or non-trivial may be determined based on the nature or type of resource expended on the action, and/or on the amount of the resource expended. The cost of a particular action may be measured in the in-game value of quantifiable resources spent on performing the action, and/or may include any other measurable indication of something of value consumed in performance of the action. In some instances, time or effort spent by the player in performing the action may be taken into account for determining the cost of the action, although such time or effort is naturally not a resource that is refundable. In this example embodiment, expenditure of any purchased resource may be considered non-trivial, regardless of the amount of resources expended. When a player thus spends an in-game currency that has been purchased with out-of-game currency, the associated action may invariably be considered to be non-trivial. When, however, the expended currency is a non-purchased in-game currency, the expense may be considered trivial if it falls below a predefined threshold value and may be considered non-trivial if it exceeds the threshold value.

The method 655 may thus include determining, at 738 (e.g., by cost determination module 437), a type of resource spent in performing the redundant action. If the resources spent in performing the redundant action include purchased resources e.g., in-game resources bought with out-of-game currency), then it is determined, at 742, that the cost is non-trivial. If, however, it is determined that only in-game resources were spent on the redundant action, it may be determined, at 744, whether or not the spent resources are above or below a predetermined threshold, upon which determination that the cost is trivial, at 746, or that the cost is non-trivial, at 742, may be based.

The game management system 240 (or, in another example embodiment, game management system 470) may thereafter determine, at 748 (e.g., by automated operation of the state assessment module 441) whether or not a state conflict that would result from allowing both the preempting action and the redundant action would be significant. Thus, for example, if the preempting action and the redundant action were respectively to change the type of nature of a common object to incompatible end states (such as by building different types of buildings in a common sight), the state conflict is determined to be significant. In an example embodiment, a state conflict is determined to be significant if they result in an environment state conflict that cannot be resolved wall that are not cumulative in nature, so that the conflict is unresolvable by changing player state information only. Responsive to determining, at 748, that a conflict with trivial cost is not associated with a significant state conflict, both the relevant actions may be allowed, at 750.

Different remedial actions may be taken when a redundant action with non-trivial cost is identified, at 742, or if a resultant environment or world state conflict(s) is determined to be significant. In such cases, the triage module 433 applies conflict resolution logic in the example form of triage logic with which it is preconfigured, so that triage decision-making is applied in automated fashion. Example remedial actions performed by the triage module 433 depending on the facts and attributes of respective conflicts, are described below.

In some instances, the redundant action may be reversed, at 750, and the redundant actor or later acting player (e.g., player B) may be compensated by restoring to the player in-game resources (such as currency, funds, and/or energy) spent in performance of the redundant action. If, e.g., in the example of FIG. 7, the relevant action that is performed by both players is the upgrading of an in-game building on which non-trivial resources are spent, the validation system 220 may invalidate the later, redundant action and restore to the later acting player (player B) the relevant spent resources. Thin is referred to as reverse syncing and may be effected by means of a reverse sync message 274 that may be communicated by the game management system 240 to the relevant client system 130, based on information included in the validation result 256.

Yet a different remedial action may be performed with respect to a redundant action with non-trivial cost, where there is a significant environment state conflict. In such instances, both actions (i.e. both the earlier action and the later action) may be invalidated and reversed, at 756, and both players may be compensated, e.g. by being refunded for the cost of the relevant actions. For example, if both players change the same object to different objects of roughly equal value, the triage module 433 automatically determine that both the relevant actions are to be invalidated or disallowed. If, e.g., player A changed/upgraded an object or area to a farm, while player B in a later redundant action changed or upgraded the same object to a blacksmith shop, the triage logic may determine that the upgraded objects are more or less equal in value and may allow neither of the actions. In such a case, the environment state information may be changed and reverse synched to both players, to reset the relevant object to its state before performance of either of the conflicting actions, and the spent resources may be reverse synched to both players.

Yet a further remedial action may be performed with respect to a redundant action with non-trivial cost, in which both the earlier action and the later conflicting action may be allowed and validated, at 758. For example, if player A first upgrades a farm to, say, a level 2 farm and player B thereafter, in a redundant action, also upgrades the same farm to level 2, the triage module 433 may allow both of the upgrading actions and may modify the environment state information, at 760, to reflect that the farm has been upgraded to a level 3 farm. Therefore, in some instances, allowing both of the conflicting actions, at 758, may comprise applying the respective effects on the environment state cumulatively, as in the example of the double upgrade mentioned above. This change in the environment state may be reverse synched to the client system 130 of both players. Allowing both of the actions may also comprise at least partially compensating one or both of the players. In instances where the two players, for example, upgraded the same object by differing amounts, both updates may be allowed, and a portion of the resources spent on the update may be refunded to one of the players. In other instances, both players may be partially compensated, e.g. being calculated pro rata according to a qualitative assessment of the respective upgrades.

Note that the particular remedial actions described in this example embodiment, and the triage logic that is applied to identify appropriate remedial actions, are nonlimiting examples, and that, in other embodiments, other factors or other combinations of factors may be taken into account for automated triage decision-making.

The example method of FIG. 6B shows identification and remediation of a single redundant action, but note that, in some embodiments, performance of the validation actions and therefore identification of further redundant actions and performance of respective further remedial actions) may continue after a first or even subsequent redundant actions are processed.

Any remedial action as described above may be accompanied by an in-game message, e.g., in an information bubble, advising the affected players of the remedial action that was taken. For example, in the last example described above, an advisory message may be generated and sent, at 765, to advise both players that the relevant farm has been upgraded to level 3 because of a concurrent upgrade by the other player.

The example embodiments thus discloses a method and system to host an asynchronous computer-implemented multiplayer game by receiving an action identifier that indicates a first action executed on a first client system responsive to player inputs received from a first player, the first action being an in-game action that was a executed based at least in part on client system game state information; accessing authoritative game state information that indicates a validated game state prior to execution of the first action, the authoritative game state information having been validated by a game management system; automatically determining, using one or more processors, that the first action fails a prerequisite check which establishes satisfaction by the first action of at least one predefined game state prerequisite with respect to the validated game state; and responsive to determining failure of the prerequisite check, determining that the first action is a redundant action which was permitted by the first client system owing to its being performed with respect to outdated client system game state information.

Responsive to determining that the first action is a redundant action, a remedial action may be executed to resolve differences between the client system game state information and the authoritative game state information resulting from the first action. The remedial action may comprise restoring to the first player spent resources associated with performance of the redundant action (that is, the "first action").

Instead, or in addition, the remedial action may comprise restoring the authoritative game state information to a state prior to performance by a second player of a preempting action that caused the redundancy of the first action. Note that the term "first action" does not mean that the relevant action is performed first time (although that is on occasion possible), or is synchronized first, but instead merely serves for the sake of clarity to distinguish a particular action that is found to be a redundant action from other in-game actions.

The remedial action may include restoring to the first player the spent resources associated with performing the first action, and may include restoring to the second player spent resources associated with performing the preempting action. In some embodiments, a portion of the totality of spent resources may be restored. For example, only that part of the spent resources constituted by spent in-game resources (contrasted with out-of-game resources, including out-of-game currency] may be restored.

Restoring the authoritative game state information to the state prior to performance of the preempting action may comprise restoring an in-game object that underwent a state-change due to performance of the first action to its state prior to performance of the preempting action. The method may in such cases in include determining that the first action and the preempting action were to change the object to different respective object types of substantially equal value.

In some embodiments, the remedial action may comprise validating the redundant action. In some instances, the redundant action may be validated without invalidating an associated preempting action, so that both the redundant action and the preempting action are allowed. In such cases, the method may include the prior operations, upon which the validating of the first action is conditional, of determining that the first action was performed at a trivial cost to the first player, and determining that the validating of the first action would not result in an environment state conflict or would result in an environmental state conflict that would not affect further game play and that is therefore not significant. The preempting action and the redundant action may in such cases comprise upgrading or improving a common in-game object, the validating of the first action resulting in upgrading of the common in-game object to an extent greater than that which would have resulted from performance solely of either the preempting action or the first action based on their respective game state information.

The method may include determining a cost to the first player associated with performing the first action, and restoring at least some spent resources to the first player responsive to determination that the first action was performed at a non-trivial cost to the first player. Determination of a non-trivial cost may comprise determining that at least some of the spent resources were purchased with out-of-game resources, or were direct out-of-game expenses. Instead, or in addition, determination of a non-trivial cost may rise to determining that an in-game value of the spent in-game resources exceeds a predefined threshold value.

Determination that the first action is a redundant action may comprise determining that the preempting action was performed by a second player on a second client system. Instead, or in addition, determination that the first action is a redundant action may comprise determining that the first client system game state information at the time of performing the first action could not reflect prior game state changes resulting from performance of the preempting action. Such a determination may comprise determining that a most recent synchronization between the first client system and the authoritative game state information prior to performance of the first action occurred before a synchronization with respect to the preempting action between the authoritative game state information and the second client system.

It is one benefit of the example embodiments described with reference to the drawings that it promotes noninvasive asynchronous operation of the game engine 204 on the client system 130, as conflicts resulting from the asynchronous gameplay and intermittent synchronization of client system game state information on multiple client systems 130 are resolved in a manner which, in some examples, is invisible to the players, and in other examples, are minimally detrimental or disruptive to the players involved. Automated resolution by the provision of the conflict resolution engine 430 and the automated application of conflict resolution logic, as exemplified with reference to FIGS. 5 and 6, serve to reduce operator intervention and workload associated with resolving conflicting actions that necessarily result from asynchronous gameplay.

Data Flow

Figure 8:
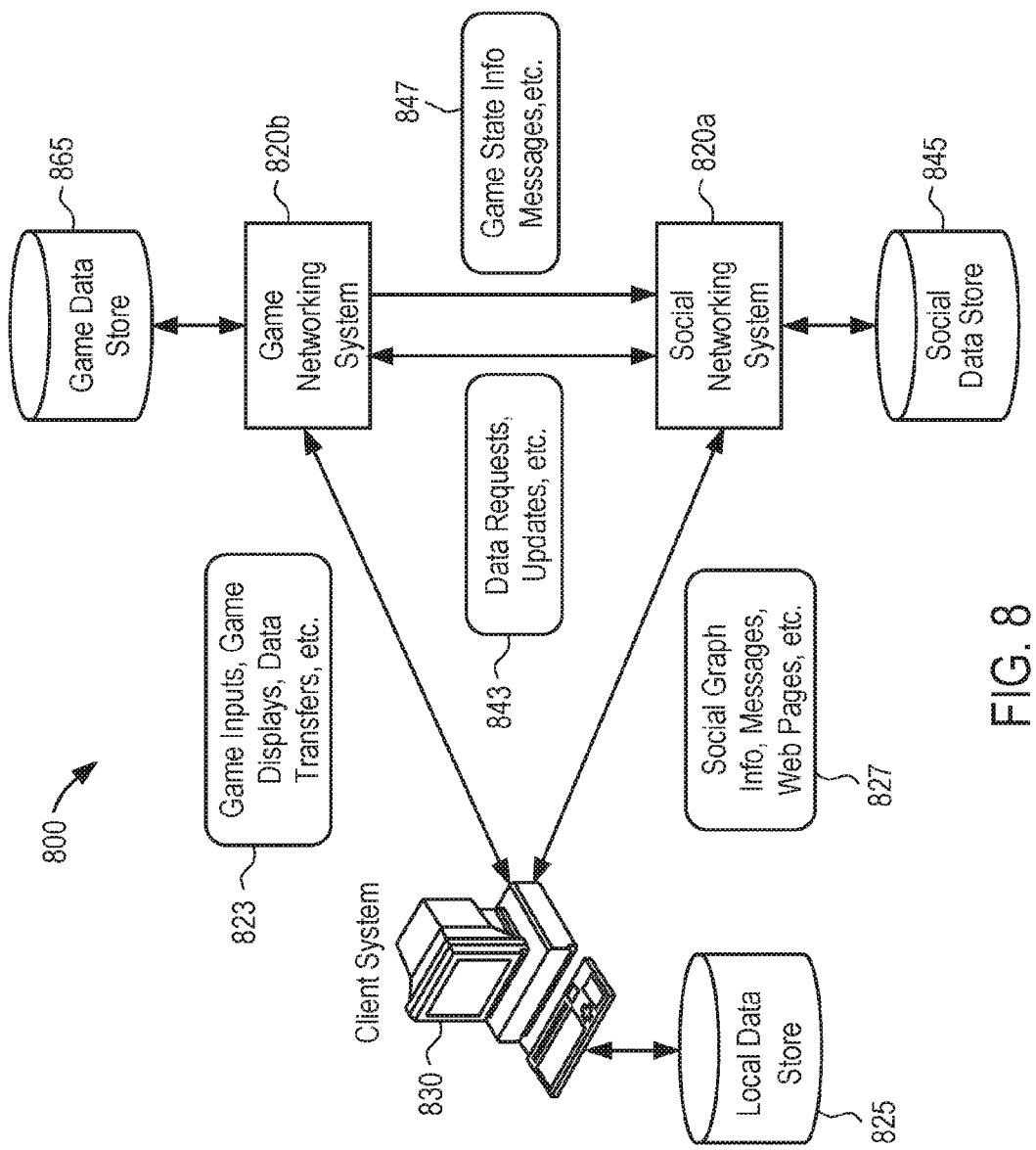
FIG. 8 illustrates an example data flow in a system.

FIG. 8 illustrates an example data flow between the components of an example system 800. In particular embodiments, system 800 can include client system 830, social networking system 820a, and game networking system 820b. A system 300 such as that described with reference to FIG. 3A may be provided by the client system 830, the social networking system 820a, or the game networking system 820b, or by any combination of these systems. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more Internet servers for communicating with client system 830 via the Internet. Similarly, social networking system 820a and game networking system 820b can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTFP packets, data requests, transaction information, updates, and other suitable data. As discussed with reference to the example embodiments of FIGS. 2-6, selected communications may be serialized documents, such as for example XML documents. At some other time, or at the same time, game networking system 820b can communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP, other communications protocols, such as HTFP-S, FTP, SNMP, TELNET, and a number of other protocols may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then reserialize the game state, now modified, into a BLOB, and pass this to a memory cache layer for lazy updates to a persistent database.

With a client-server environment in which the online games may run, one server system, such as game networking system 820*b*, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820*b* for further processing. In addition, multiple client systems 830 may transmit other types of application data to game networking system 820*b*.

In particular embodiments, a computer-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820*a* or game networking system 820*b*), where an instance of the online game is executed remotely on a client system 830, which then transmits application event data to the hosting system such that the remote game server synchronizes the game state associated with the instance executed by the client system 830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820*a* or game networking system 820*b*). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game that the player is in. When a player resumes playing the game next time, game networking system 820*b* may retrieve the corresponding BLOB from the database to determine the most-recent values of the game-related data. In particular embodiments, while a player is playing the online game, game networking system 820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 9:
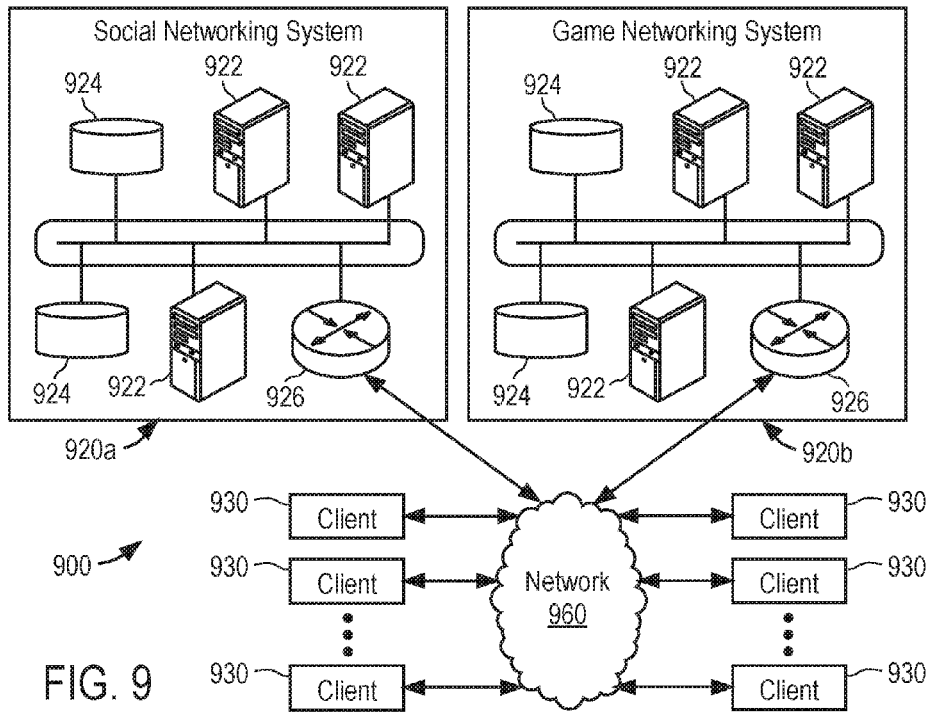
FIG. 9 illustrates an example network environment.

Particular embodiments may operate in a WAN environment, such as the Internet, including multiple network-addressable systems. FIG. 9 illustrates an example network environment 900, in which various example embodiments may operate. Network cloud 960 generally represents one or more interconnected networks, over which the systems and hosts described herein can communicate. Network cloud 960 may include packet-based WAN (such as the Internet), private networks, wireless networks, satellite networks, cellular networks, paging networks, and the like. As FIG. 9 illustrates, particular embodiments may operate in a network environment 900 comprising one or more networking systems, such as social networking system 920*a*, game networking system 920*b*, and one or more client systems 930. The components of social networking system 920*a* and game networking system 920*b* operate analogously; as such, hereinafter they may be referred to simply as networking system 920. Client systems 930 are operably connected to the network environment 900 via a network service provider, a wireless carrier, or any other suitable means.

Networking system 920 is a network-addressable system that, in various example embodiments, comprises one or more physical servers 922 and data stores 924. The one or more physical servers 922 are operably connected to network cloud 960 via, by way of example, a set of routers and/or networking switches 926. In an example embodiment, the functionality hosted by the one or more physical servers 922 may include web or HTTP servers, FTP servers, and, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyped inks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment 900 described above and illustrated in FIG. 9 is described with respect to social networking system 920a and game networking system 920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
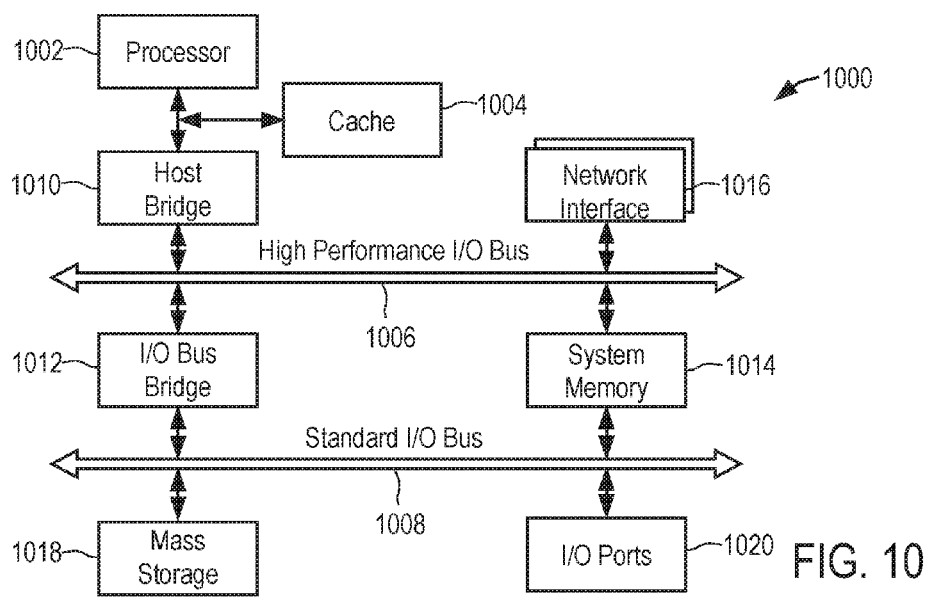
FIG. 10 illustrates an example computer system architecture.

FIG. 10 illustrates an example computing system architecture, which may be used to implement a server 922 or a client system 930. In one embodiment, hardware system 1000 comprises a processor 1002, a cache memory 1004, and one or more executable modules and drivers, stored on a tangible computer-readable medium, directed to the functions described herein. Additionally, hardware system 1000 may include a high performance input/output (I/O) bus 1006 and a standard I/O bus 1008. A host bridge 1010 may couple processor 100 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 822, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures, and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit (ASIC).

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method to host an asynchronous computer-implemented multiplayer game, the method comprising:
   receiving an action identifier that indicates a first action executed on a first client system responsive to player inputs received from a first player, the first action being an in-game action that was a executed based at least in part on client system game state information;
   accessing authoritative game state information that indicates a validated game state prior to execution of the first action, the authoritative game state information having been validated by a game management system;
   automatically determining, using a validation engine comprising circuitry configured to perform the determining, that the first action fails a prerequisite check which establishes satisfaction by the first action of at least one predefined game state prerequisite with respect to the validated game state;

in an automated operating performed responsive to determining failure of the prerequisite check and performed using a redundancy determination module comprising circuitry configured to perform the automated operation, determining that the first action is a redundant action which was permitted by the first client system owing to its being performed with respect to outdated client system game state information; and in an automated process performed responsive to determining that the first action is a redundant action and performed using a conflict resolution engine comprising circuitry configured to perform the automated process, executing a remedial action that comprises restoring the authoritative game state information to the state prior to performance by a second player of a preempting action that caused redundancy of the first action.

2. The method of claim 1, wherein the remedial action further comprises restoring to the first player at least some spent resources associated with performance of the first action.

3. The method of claim 1, wherein the remedial action further includes restoring to the first player at least some of the spent resources associated with performing the first action, and restoring to the second player at least some spent resources associated with performing the preempting action.

4. The method of claim 1, wherein restoring the authoritative game state information to the state prior to performance of the preempting action comprises restoring an in-game object that underwent a state-change due to performance of the first action to its state prior to performance of the preempting action.

5. The method of claim 4, further comprising a determining that the first action and the preempting action were to change the object to different respective object types of substantially equal value.

6. The method of claim 1, further comprising:

determining that a further redundant action performed by a corresponding player satisfies predefined validation criteria; and responsive thereto, executing with respect to the further redundant action a remedial action that comprises validating the further redundant action.

7. The method of claim 6, wherein the predefined validation criteria comprise:

determining that the further redundant action was performed at a trivial cost to the corresponding player; and determining that the validating of the further redundant action would not result in an environment state conflict.

8. The method of claim 6, wherein the first further redundant action and a corresponding preempting action comprise upgrading or improving a common in-game object, the validating of the further redundant action resulting in upgrading of the common in-game object to an extent greater than that which would have resulted from performance solely of either the further redundant action or the corresponding preempting action based on their respective game state information.

9. A system to host an asynchronous computer-implemented multiplayer game, the system comprising:

a receiving module to receive an action identifier that indicates a first action executed on a first client system responsive to player inputs received from a first player, the first action being an in-game action that was executed based at least in part on client system game state information;

a validation engine to perform a prerequisite check for the first action based at least in part on authoritative game state information that indicates a validated game state prior to execution of the first action, to automatically determine that the first action fails a prerequisite check which establishes satisfaction by the first action of at least one predefined game state prerequisite with respect to the validated game state; and a redundancy determination module to determine, responsive to failure of the prerequisite check, that the first action is a redundant action which was permitted by the first client system owing to its being performed with respect to outdated client system game state information; and a conflict resolution engine comprising circuitry configured to execute a remedial action responsive to determining that the first action is a redundant action, the remedial action restoring the authoritative game state information to a state prior to performance by a second player of a preempting action that caused the redundancy of the first action.

10. The system of claim 9, wherein the conflict resolution engine is further configured to restore to the first player at least some spent resources associated with performance of the first action.

11. The system of claim 10, further comprising a cost determination module to determine a cost to the first player associated with performing the first action, the conflict resolution engine being configured to restore the spent resources to the first player responsive to determination that the first action was performed at a non-trivial cost to the first player.

12. The system of claim 11, wherein the conflict resolution engine is configured to determine that the first action was performed at a non-trivial cost to the first player responsive to determining that at least some of the spent resources were purchased with out-of-game resources.

13. The system of claim 11, wherein the conflict resolution engine is configured to determine that the first action was performed at a non-trivial cost of the first player responsive to determining that an in-game value of the spent resources exceeds a predefined threshold value.

14. The system of claim 9, wherein the redundancy determination module is configured to determine that the first action is a redundant action by determining that the preempting action which effected a game state change that resulted in failure of the prerequisite check for the first action was performed by the second player on a second client system.

15. The system of claim 14, wherein the redundancy determination module is configured to determine that the first action is a redundant action by determining that the first client system game state information at the time of performing the first action could not reflect prior game state changes resulting from performance of the preempting action.

16. A non-transitory computer-readable storage medium having stored thereon instructions for causing a machine, when executing the instructions, to perform operations comprising:

receiving an action identifier that indicates a first action executed on a first client system responsive to player inputs received from a first player, the first action being an in-game action that was a executed based at least in part on client system game state information;

accessing authoritative game state information that indicates a validated game state prior to execution of the first action, the authoritative game state information having been validated by a game management system;

determining that the first action fails a prerequisite check which establishes satisfaction by the first action of at least one predefined game state prerequisite with respect to the validated game state;

responsive to determining failure of the prerequisite check, determining that the first action is a redundant action which was permitted by the first client system owing to its being performed with respect to outdated client system game state information; and responsive to determining that the first action is a redundant action, executing a remedial action that comprises restoring the authoritative game state information to the state prior to performance by a second player of a preempting action that caused redundancy of the first action.

* * * * *